(12) United States Patent
Kim et al.

(10) Patent No.: US 10,277,276 B2
(45) Date of Patent: *Apr. 30, 2019

(54) SYSTEMS AND METHODS FOR IMPLEMENTING APPLICATION PROFILES AND DEVICE CLASSES IN POWER LINE COMMUNICATION (PLC) ENVIRONMENTS

(71) Applicant: TEXAS INSTRUMENTS INCORPORATED, Dallas, TX (US)

(72) Inventors: Il Han Kim, Allen, TX (US); Anand G. Dabak, Plano, TX (US); Badri N Varadarajan, Mountain View, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/793,900

(22) Filed: Oct. 25, 2017

(65) Prior Publication Data

US 2018/0048354 A1    Feb. 15, 2018

Related U.S. Application Data

(60) Continuation of application No. 14/679,360, filed on Apr. 6, 2015, now Pat. No. 9,831,914, which is a
(Continued)

(51) Int. Cl.
*H04B 3/54* (2006.01)
*H04L 12/911* (2013.01)

(52) U.S. Cl.
CPC .......... *H04B 3/542* (2013.01); *H04L 47/78* (2013.01); *H04B 2203/5408* (2013.01); *H04B 2203/5416* (2013.01)

(58) Field of Classification Search
CPC .......... H04B 3/542; H04B 2203/5416; H04B 2203/5408; H04L 47/78
See application file for complete search history.

(56) References Cited

U.S. PATENT DOCUMENTS

| 7,158,013 B2 | 1/2007 | Schwager et al. |
| 7,876,717 B2 | 1/2011 | Iwamura |

(Continued)

*Primary Examiner* — Brian D Nguyen
(74) *Attorney, Agent, or Firm* — Rose Alyssa Keagy; Charles A. Brill; Frank D. Cimino (57) ABSTRACT

Systems and methods for application profiles and device classes in power line communications (PLCs) are described. In some embodiments, a PLC device has the device class defined by a PHY layer and may include a processor and a memory coupled to the processor. The memory may be configured to store program instructions, which may be executable by the processor to cause the PLC device to communicate with a higher-level PLC apparatus over a power line using a frequency band. The frequency band may be selected based upon an application profile and/or a device class associated with the PLC device. In some implementations, the higher-level PLC apparatus may include a PLC gateway or a data concentrator, and the PLC device may include a PLC modem or the like. Examples of application profiles include access communications, in-premises connectivity, AC charging, and/or DC charging. Device classes may represent a minimum communication data rate and/or an operating frequency band restriction of the PLC device.

13 Claims, 4 Drawing Sheets

FIG. 1

Related U.S. Application Data division of application No. 13/230,419, filed on Sep. 12, 2011, now Pat. No. 9,000,897.

(60) Provisional application No. 61/382,762, filed on Sep. 14, 2010.

(56) References Cited

U.S. PATENT DOCUMENTS

| | | |
|---|---|---|
| 8,462,902 B1 | 6/2013 | Barnickel, Jr. et al. |
| 2002/0022453 A1 | 2/2002 | Balog et al. |
| 2003/0038710 A1 | 2/2003 | Manis et al. |
| 2004/0042413 A1 | 3/2004 | Kawamura et al. |
| 2007/0086408 A1 | 4/2007 | Kuroda et al. |
| 2007/0229231 A1 | 10/2007 | Hurwitz et al. |
| 2007/0279196 A1 | 12/2007 | Macaluso et al. |
| 2008/0081667 A1 | 4/2008 | Parikh et al. |
| 2009/0207801 A1 | 8/2009 | Morton et al. |
| 2010/0111199 A1 | 5/2010 | Sharma |
| 2011/0129007 A1 | 6/2011 | Schwager et al. |
| 2011/0190967 A1* | 8/2011 | Burk .................. B60L 11/1846 701/22 |
| 2011/0194624 A1* | 8/2011 | Yakar ...................... H04B 3/54 375/257 |
| 2011/0197085 A1* | 8/2011 | Wu ....................... H04B 3/546 713/323 |
| 2011/0204726 A1* | 8/2011 | Ito ........................... H04B 3/54 307/117 |
| 2011/0248567 A1* | 10/2011 | Brown ...................... H02J 3/18 307/48 |
| 2012/0027062 A1* | 2/2012 | Garcia ................... H04B 3/544 375/224 |
| 2013/0059594 A1 | 3/2013 | Hui et al. |

* cited by examiner

SYSTEMS AND METHODS FOR IMPLEMENTING APPLICATION PROFILES AND DEVICE CLASSES IN POWER LINE COMMUNICATION (PLC) ENVIRONMENTS

CROSS-REFERENCE TO RELATED APPLICATIONS

This application is a Continuation of U.S. patent application Ser. No. 14/679,360 filed Apr. 6, 2015, now U.S. Pat. No. 9,831,914, which claims benefit to U.S. patent application Ser. No. 13/230,419, filed on Sep. 12, 2011, now U.S. Pat. No. 9,000,897, which claims the benefit of the filing date of U.S. Provisional Patent Application No. 61/382,762, which is titled "Application Profiles and Device Classes" and was filed Sep. 14, 2010, the disclosure of which is hereby incorporated by reference herein in its entirety.

TECHNICAL FIELD

Embodiments are directed, in general, to power line communications, and, more specifically, to systems and methods for implementing application profiles and devices classes in power line communication environments.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, and ITU-T G.hn (e.g., G.9960 and G.9961) specifications.

SUMMARY OF THE INVENTION(S)

Systems and methods for implementing application profiles and device classes in power line communication (PLC) environments are described. In an embodiment, a PLC device may include a processor and a memory coupled to the processor. The memory may be configured to store program instructions, and the program instructions may be executable by the processor to cause the PLC device to communicate with a higher-level PLC apparatus over a power line using a given frequency band. The frequency band may be selected based, at least in part, upon an application profile and a device class associated with the PLC device.

In some implementations, the processor may include a digital signal processor (DSP), an application specific integrated circuit (ASIC), a system-on-chip (SoC) circuit, a field-programmable gate array (FPGA), a microprocessor, a microcontroller, or the like. Also, the higher-level PLC apparatus may include a PLC gateway or a PLC data concentrator, whereas the PLC device may include a PLC modem or the like. By way of illustration and not limitation, examples of application profiles may include access communication, in-premises connectivity, alternating current (AC) charging, and/or direct current (DC) charging. Moreover, device classes may represent a minimum communication data rate(s) and/or operating frequency band restriction(s).

In some cases, the program instructions may be further executable by the processor to cause the PLC device to monitor one or more PLC communications between two or more other PLC devices over the power line, identify a frequency band unused by the two or more other PLC devices, and select a frequency band as at least a portion of the unused frequency band. In other cases, the program instructions may be further executable by the processor to cause the PLC device to transmit a request to the higher-level PLC apparatus for an indication of availability of frequency bands, where the higher-level PLC apparatus is configured to maintain a record of frequency use by one or more other PLC devices communicating over the power line, receive instructions from the higher-level PLC apparatus indicating the availability or unavailability of one or more frequency bands, and select a frequency band based, at least in part, upon the received instructions.

In yet other cases, the program instructions may be further executable by the processor to cause the PLC device to transmit a request to the higher-level PLC apparatus to communicate over the power line, where the request includes an indication of the application profile and device class of the PLC apparatus and the higher-level PLC apparatus is configured to allocate the given frequency band to the PLC device based upon an analysis the request, and to receive instructions from the higher-level PLC apparatus allocating the given frequency band to the PLC device.

In another embodiment, a method performed by a PLC apparatus may include assigning a first frequency band to a first PLC device communicating over a power line. The first frequency band may be selected based, at least in part, upon a first application profile and a first device class associated with the first PLC device. In some implementations, the PLC apparatus may include at least one of a PLC gateway or a data concentrator, and the first PLC device may include a PLC modem.

In some embodiments, the method may also include receiving a request from the first PLC device to communicate over the power line, determining a frequency band unused by one or more other PLC devices communicating over the power line, and transmitting an instruction to the first PLC device assigning the first frequency band as at least a portion of the unused frequency band. Furthermore, the method may also include identifying a conflict between the first frequency band and a second frequency band in use by a second PLC device coupled to the power line, the second PLC device including a second application profile and a second device class, and resolve the conflict based, at least in part, upon a comparison between (a) the first and second application profiles and/or (b) the first and second device classes. For example, in some cases, resolving the conflict may include limiting a data rate of the first or second PLC devices. Additionally or alternatively, resolving the conflict may include modifying the second frequency band of the second PLC device.

In yet another embodiment, a tangible computer-readable storage medium may have program instructions stored thereon that, upon execution by one or more power line communication (PLC) systems, cause the one or more PLC systems to receive a request from a first PLC device to communicate over a power line, where request includes an indication of a first application profile and a first device class corresponding to the first PLC device, identify one or more frequency bands used by one or more other PLC devices communicating over the power line, and transmit an instruction to the first PLC device assigning a first frequency band to the first PLC device based, at least in part, upon the one or more frequency bands, the first application profile, and the first device class.

Similarly as noted above, the program instructions upon execution by the one or more PLC systems may further cause the one or more PLC systems to identify a conflict between the first frequency band and a second frequency band in use by a second PLC device. For example, in some cases, the one or more PLC systems may limit a data rate of the first or second PLC devices to thereby create an unused frequency band, where the first frequency band is selected as at least a portion of the unused frequency band. Additionally or alternatively, the one or more PLC systems may further cause the one or more PLC systems to modify the second frequency band allocated to the second PLC device to thereby create an unused frequency band, the first frequency band also being selected as at least a portion of the unused frequency band.

BRIEF DESCRIPTION OF THE DRAWINGS

Having thus described the invention(s) in general terms, reference will now be made to the accompanying drawings, wherein:

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Agreements concerning various power line communication (PLC) standards have been made. For example, the ITU-T G.hnem, IEEE 1901.2 standard includes architecture aspects of the physical (PHY) layer and the media access control (MAC) layer of PLC's open system interconnection (OSI) model. Network architectures are also being discussed. Meanwhile, the inventors hereof have recognized a need to identify application areas and/or regulatory constraints. The inventors have also recognized a need to define device classes spanning complexity-capability tradeoffs. As such, among other things, this specification discusses the concept of application profiles and device classes, which may be implemented and/or adapted to facilitate certain PLC operations (e.g., allocation of frequency bands to devices in a PLC network, etc.). Moreover, this specification describes certain embodiments of systems and methods that may yield optimized devices for various application areas and/or performance targets.

Figure 1:
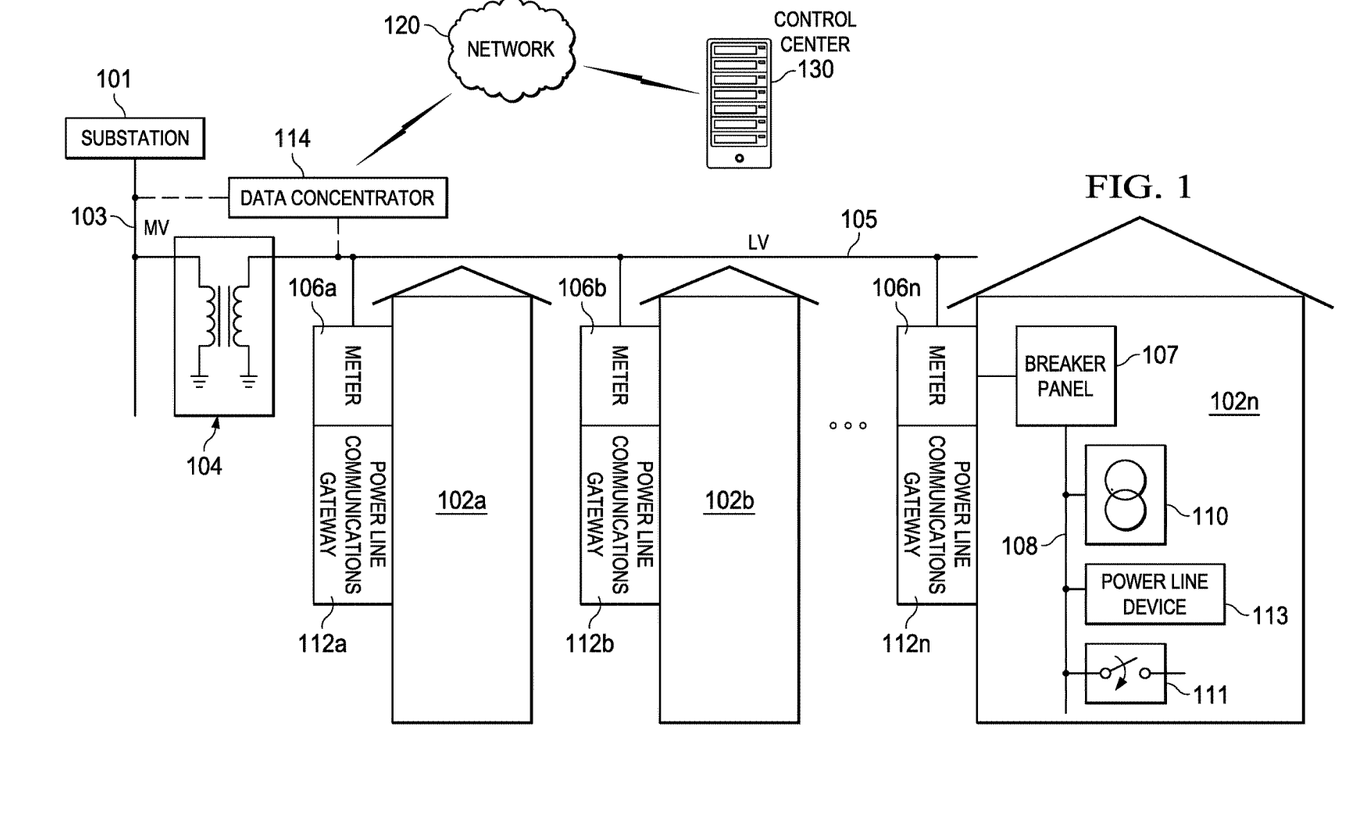
FIG. 1 is a diagram of a PLC environment according to some embodiments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

Figure 2:
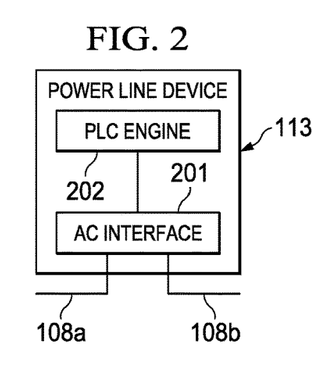
FIG. 2 is a block diagram of a PLC device or modem according to some embodiments.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate. In various embodiments described in more detail below, the frequency band in which PLC device 113 operates may be selected or otherwise allocated based, at least in part, upon an application profile and/or a device class associated with PLC device 113.

Figure 3:
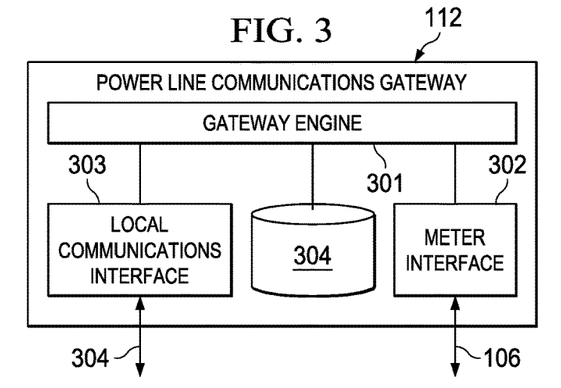
FIG. 3 is a block diagram of a PLC gateway according to some embodiments.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZigBee®, Bluetooth®, WiFi, WiMax, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies. In some embodiments, such frequency band allocation may be based upon unused frequency bands as well as application profiles and/or device classes of each individual device in the PLC network.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

Figure 4:
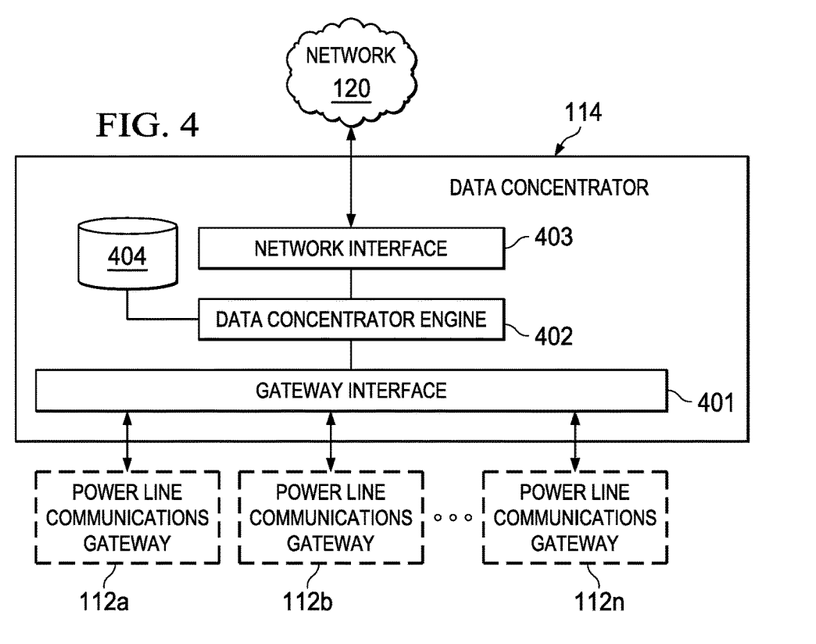
FIG. 4 is a block diagram of a PLC data concentrator according to some embodiments.

FIG. 4 is a block diagram of a PLC data concentrator according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

To facilitate PLC communications among the various elements shown in FIGS. 1-4, this specification identifies certain application areas and/or regulatory constraints. Specifically, Table I illustrates a few example, non-limiting, PLC application areas or profiles according to some embodiments. These application profiles may include, for instance, access communication on LV- or MV-side, access communication with MV and LV side modems, alternating current (AC) charging, direct current (DC) charging, and in-premises connectivity (e.g., home networking). Each application profile is listed along with certain requirements, conditions, and targets. It should be noted, however, that these requirements, conditions, and targets are provided by way of illustration and not limitation. In various implementations, these requirements, conditions, and/or targets may vary depending upon regional or local standards.

TABLE I

Example Application Profiles

| Application Profile | Example Requirements | Example Conditions | Example Targets |
|---|---|---|---|
| Access network on LV- or MV-side alone | No need to cross MV/LV transformers; enable communication of end-points with concentrator | Relatively benign; moderate to high SNR through most of the band; narrowband and impulsive noise | Data rates up to 10 s of kbps |
| Access network with MV and LV side modems | Need to cross MV/LV transformers; enable communication of end-points with concentrator | Severe frequency selectivity observed at frequencies greater than 30 kHz; only parts of the band may support communication; common narrowband and impulsive noise | Scalable data rates |
| PLC for AC charger cables | PLC between electric vehicles (EV) and EVSE | Relatively benign | Data rates from 10 s to 100 s of kbps, depending on regional constraints |
| PLC for DC charger cables | PLC between EV and electric vehicle supply equipment (EVSE) | Severe attenuation and narrowband interferers | Data rates from 10 s to 100 s of kbps, depending on regional constraints |
| Home area network | Connectivity between in-home devices and/or appliances | Moderate to severe frequency selectivity; narrowband and impulsive noise | Data rates from 10 s to 100 s of kbps, depending on regional constraints |

In addition, regulatory characteristics of various geographical regions are summarized in Table II below. The present situation in Europe is clearest, with an established demarcation of frequency bands for various applications. However, Europe also prohibits the use of frequencies above 148.5 kHz, resulting in narrow bandwidths for non-access applications. Federal Communications Commission (FCC) Rule 15.107 allows the use of the frequencies from 9-500 kHz, but only radiated emissions limits are given for the band from 9-500 kHz. Again, it should be noted that these regulations are provided by way of illustration and not limitation. In various implementations, these regulatory characteristics may vary depending upon evolving standards in the various geographic regions.

TABLE II

Regulatory Characteristics by Region

| Region | Application | Documentation | Brief Description |
|---|---|---|---|
| Europe | LV lines, 9-500 kHz band | Cenelec EN50065-1 | Cenelec-A band for access applications; Cenelec-B/C/D for other applications with access rules for Cenelec C |
| US | LV lines, 9-500 kHz band | FCC 15.107 | No clear requirements on conducted emissions; no access rules mentioned |
| Japan | LV lines, 9-500 kHz band | ARIB | Different requirements from 9-200 kHz and beyond |
| Anywhere | MV lines | | Unclear |

In some embodiments, an application profile may include a maximum data rate that can be transmitted and/or received. Another such parameter may include the bandwidth of the transmitted and/or received signal. For example, in contrast with the Cenelec bands, the FCC/ARIB bands are wide (~500 kHz), and it may be desirable to divide them into smaller subbands.

In some implementations, each application profile (e.g., shown in Table I) may use only a respective portion of the total available frequency band, which may enable a host of network devices that operate only within their respective subbands. Moreover, application profiles may allow the existence of multiple networks operating in different frequencies in the same physical or geographic neighborhood. As an example, a specific application profile may include street lighting, where the desired data rates may be low. At each subband, one type of device or device class may be used. For a given application profile, its subband may be fixed, or this subband may move according to channel quality parameters such as SNR, signal level, and/or noise level. Additionally or alternatively, a single application may use two or more different subbands according to SNR, signal level, and/or noise level.

Therefore, in addition to the application profiles described above, devices classes may also be defined to determine subband(s) within a broader band network where specific (or specific types of) PLC devices may be configured to operate. Table I shows an example of subband selection (tone spacing and Fast Fourier Transform (FFT) length) following G.hnem guidelines for a fixed band.

TABLE III

An Example of Subband Selection

| Bands | Generator clock for carrier spacing = 24.4140625 kHz | Generator clock for carrier spacing = 15.625 kHz |
|---|---|---|
| Tone spacing | 3.0517578125 kHz; 512-pt FFT; (327.68 µs) | 3.125 kHz; 512-pt FFT; (320 µs) |
| Start tone index | N1 | N1 |
| End tone index | N2 | N2 |
| Start frequency | N1*3.0517578125 | N1*3.0517578125 |
| End frequency | N2*3.0517578125 | N2*3.0517578125 |

As another example of subband selection, Table IV below is similar to Table III above, but specifically in the context of the IEEE 1901.2 standard:

TABLE IV

Another Example of Subband Selection (IEEE 1901.2)

| Tone spacing | 4.6875 kHz; 256-pt FFT; (213.3 µs) |
|---|---|
| Start tone index | N1 |
| End tone index | N2 |
| Start frequency | N1*4.6875 |
| End frequency | N2*4.6875 |

In other embodiments, multiple subbands may be selected multiple times, which may be fixed a priori or may be dynamically selected—i.e., moving. In some implementations, the preamble of a given device may be computed based on the preamble of full frequency bands. For example, frequency mask(s) may be applied on the full FCC frequency band preamble, the band may be selected from start tone index to end tone index using the full FCC frequency band preamble, and an inverse-FFT (IFF) operation may be performed to yield a time domain signal to enable the full FCC frequency band to detect the preamble of this subband device. As discussed above, one or more bands may be selected if necessary, and the same principles may be applied for preamble generation.

If a PLC device is configured to join a subnetwork that is already occupied by various subbands, the device may avoid the occupied subbands. For example, using preambles or other suitable techniques, each receiver may be able to detect the presence of a subnetwork that uses multiple subband(s). In this particular case, the device may let a domain master know the usage of each subband and the domain master can allocate new subband(s) for this device. These and other techniques are described in detail below with respect to FIGS. 5-10.

For each application and region, some embodiments may define different device classes to span a suitable range of PLC complexity-performance tradeoffs. For example, in some implementations, transmitter complexity may depend on the highest data rate to be supported. (Firstly, the digital processing and memory requirements are determined by the maximum data rate. Secondly, higher data rates also imply a higher operating SNR, and the transmitter's analog impairments should cause a noise floor significantly lower than the noise value determined by the operating SNR.) Similarly, receiver design may also be more challenging at the highest data rate.

Consequently, in some implementations, device classes may be defined with varying transmitter and receiver data rate capabilities at the PHY level. Further device classes may be defined, for example, depending on MAC capabilities. Additionally or alternatively, device classes may be defined with transmitter and receiver over sub-bands at the PHY level. These specific transmitter and receiver may operate only on a specific sub-band of the FCC frequency band, for example. In some application profiles, a single device class may be defined, whereas in other application profiles two or more device classes may be so defined. Within a same application profile, all device classes may be required to support transmission and reception at minimum data rates, although some device classes may not be able to support transmission and/or reception at higher data rates.

In some embodiments, application and/or region specific attributes for the PHY and/or MAC layers of a PLC specification may be defined. For example, these attributes may be constant through the lifetime of a device. Also, in cases where the same device may support multiple applications, it may maintain static attributes for each application profile.

Additionally or alternatively, a standards body may suggest different procedures for different applications and regions. As a non-limiting example, operation in the Cenelec-C band may require following the band-in-use access protocols defined in document EN50065-1. Moreover, to aid in finalizing a specification, application and/or region-specific performance targets may be drawn up, similar to those in the tables above. A standards body may also define device-specific attributes to determine the device class. In some cases, no device-specific procedures may be defined within a given application profile.

Figure 5:
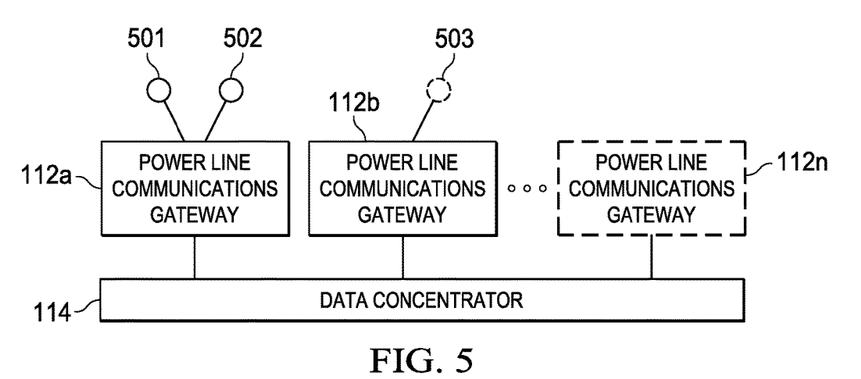
FIG. 5 is a diagram illustrating a new PLC device and/or PLC gateway joining an existing PLC environment according to some embodiments.

FIG. 5 is a diagram illustrating a new PLC device and gateway entering a PLC environment according to some embodiments. In this example, PLC devices 501 and 502 are currently communicating with PLC data concentrator 114 via PLC gateway 112a, each device operating within its designated frequency band. Also, PLC gateway 112b is already "online" and configured to communicate with PLC data concentrator 114. In this environment, a new PLC device 503 may be introduced into the system, and therefore a determination may be made as to its operating frequency. Such determination may be based, for example, upon the device's application profile and/or device class. Similarly, a new PLC gateway 112n may be introduced and may also need its own frequency band assignment or selection. In some embodiments, PLC device 503 and/or PLC gateway 112n may each make its own independent determination of which frequency band to operate in (as shown, for example, in FIG. 6). In other embodiments, PLC device 503 and/or PLC gateway 112n may communicate its application profile and device class to a higher-level PLC system (e.g., PLC device 503 may communicate with PLC gateway 112b and/or PLC data concentrator 114, while PLC gateway 112n may communicate with PLC data concentrator 114) to obtain information that enables it to self-allocate a particular frequency band (as shown, for example, in FIGS. 7 and 8). In yet other embodiments, the higher-level PLC system (e.g., PLC gateway 112b and/or PLC data concentrator 114) may receive a request from the lower-end PLC system (e.g., PLC device 503), make a frequency allocation determination based on the ascertained application profile and device class, and communicate that determination to the lower-end PLC system (as shown, for example, in FIGS. 9 and 10).

In various embodiments, a "lower-level" PLC device may include any device, modem, system, or apparatus that is placed "downstream" from a "higher-level" PLC device. For example, still referring to FIG. 5, it may be said that PLC device 503 is a lower-level device with respect to both PLC gateway 112b and PLC concentrator 114. Meanwhile, PLC gateway 112b may be considered a higher-level device with respect to PLC device 503, and a lower-level device with respect to PLC concentrator 114. Furthermore, in various embodiments, a higher-level PLC device may be the domain master for a lower-level PLC device, and therefore may be gather information about the usage of each band and/or subband, and may allocate new band(s) and/or subband(s) for other device(s).

Figure 6:
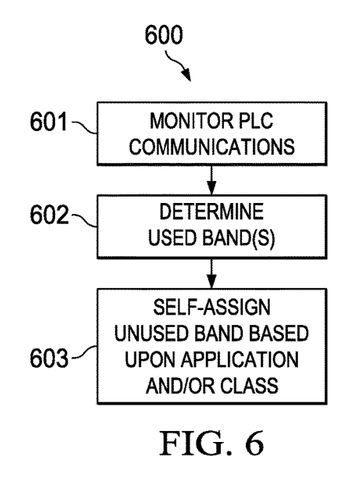
FIG. 6 is a flowchart of a first method for frequency band assignment or allocation from the perspective of a PLC device according to some embodiments.

FIG. 6 is a flowchart of a first method for frequency band assignment or allocation from the perspective of a PLC device according to some embodiments. In some cases, method 600 may be performed by PLC device 503 and/or PLC gateway 112n shown in FIG. 5 (i.e., a "lower-level" PLC device or system). At block 601, the lower-level PLC device monitors PLC communications, for example, over power line 108. At block 602, the lower-level PLC device may determine the frequency bands being used by two or more other devices over the same power line based on the monitoring. Then, at block 603, the lower-level PLC device may self-assign at least a portion of an unused frequency band, which may be determined, for example, based on the PLC device's application profile and/or device class.

Figure 7:
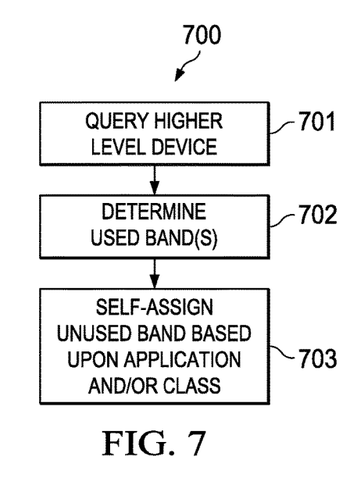
FIG. 7 is a flowchart of a second method for frequency band assignment or allocation from the perspective of a PLC device according to some embodiments.

FIG. 7 is a flowchart of a second method for frequency band assignment or allocation from the perspective of a PLC device according to some embodiments. Again, method 700 may be performed by PLC device 503 and/or PLC gateway 112n shown in FIG. 5 (i.e., a "lower-level" PLC device or system). At block 701, the lower-level PLC device may transmit a message over power line 108 indicating that it wishes to enter the network and/or requesting information regarding frequency band usage. In response to the message, at block 702 the lower-level PLC device may receive a message containing information sufficient for it to ascertain used and/or unused frequency bands. In some embodiments, a dedicated frequency band may be reserved for frequency band assignment and other setup communications among lower- and higher-level PLC devices. At block 703, the lower-level PLC device may then self-assign at least a portion of an unused frequency band, which again may be determined, for example, based on the PLC device's application profile and/or device class.

Figure 8:
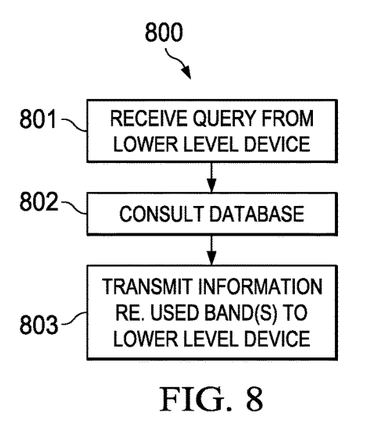
FIG. 8 is a flowchart of the second method for frequency band assignment or allocation from the perspective of a PLC gateway or PLC data concentrator according to some embodiments.

FIG. 8 is a flowchart of the second method for frequency band assignment or allocation from the perspective of a PLC gateway or data concentrator according to some embodiments, and as such may complement operations shown in FIG. 7. For example, method 800 may be performed by PLC gateway 112*n* and/or PLC data concentrator 114 shown in FIG. 5 (i.e., a "higher-level" PLC device or system). Specifically, at block 801, a higher-level PLC device or system may receive the query transmitted by the lower-level device in block 701 of FIG. 7. At block 802, the higher-level device may consult a database (e.g., databases 304 and/or 404) to obtain records indicating the frequency usage in the network by other devices. Then, at block 803, the higher-level device may transmit information corresponding to used and/or unused frequency band(s) to the lower-level device, which receives this information in order to make the determination described in connection with block 702 of FIG. 7.

Figure 9:
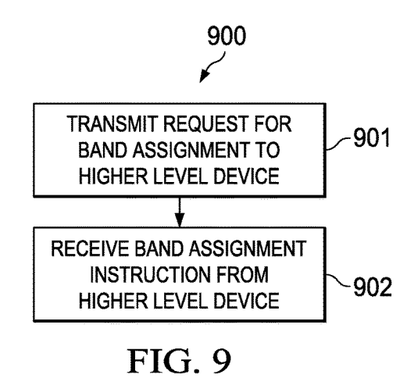
FIG. 9 is a flowchart of a third method for frequency band assignment or allocation from the perspective of a PLC device according to some embodiments.

FIG. 9 is a flowchart of a third method for frequency band assignment or allocation from the perspective of a PLC device according to some embodiments. In various embodiments, method 900 may be performed by PLC device 503 and/or PLC gateway 112*n* shown in FIG. 5 (i.e., a "lower-level" PLC device or system). At block 901, the lower-level PLC device may transmit a request for frequency band assignment to a higher-level PLC device. In response to the request, at block 902 the lower-level PLC device may receive a message or instruction indicating its frequency band allocation for subsequent operation. Similarly as noted above, in some embodiments, a dedicated frequency band may be reserved for band assignment and other setup communications among various PLC devices.

Figure 10:
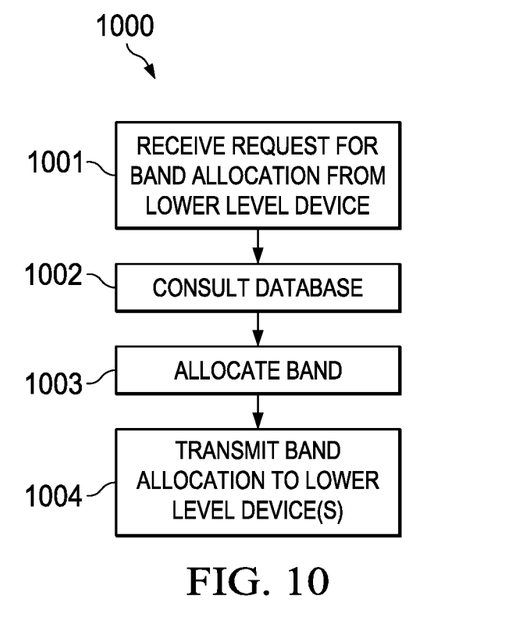
FIG. 10 is a flowchart of the third method for frequency band assignment or allocation from the perspective of a PLC gateway or PLC data concentrator according to some embodiments.

FIG. 10 is a flowchart of the third method for frequency band assignment or allocation from the perspective of a PLC gateway or data concentrator according to some embodiments, and as such may complement operations shown in FIG. 9. In various embodiments, method 1000 may be performed by PLC gateway 112*n* and/or PLC data concentrator 114 shown in FIG. 5 (i.e., a "higher-level" PLC device or system). At block 1001, the higher-level PLC device may receive the request for frequency band allocation issued by a lower-level PLC device, for example, at block 901 of FIG. 9. At block 1002, the higher-level PLC device may consult a frequency use database (e.g., database 304 and/or 404) to determine unused frequency band(s). At block 1003, the higher-level PLC device may allocate at least a portion of the unused frequency band(s) to the lower-level PLC device based on that device's application profile and/or device class. For example, the higher-level PLC device may create a new record within database 304 and/or 404 reflecting the new band assignment. Then, at block 1004, the higher-level PLC device may transmit the band allocation information to the lower-level device.

In some cases, the higher-level PLC device or system may receive a request for frequency band that results in a conflict with an existing device's current allocation. For example, the request from the lower-level PLC device may itself indicate a desired frequency of operation that is already being used by another device. In those cases, the higher-level PLC device or system may resolve the conflict, for example, by comparing the application profiles and/or device classes of the devices competing for bandwidth. For instance, PLC device indicating a device class with a higher priority (e.g., it may have a higher minimum data rate requirement) may be allocated at least a portion of an already used frequency band, and the lower priority device occupying that band may have its frequency band allocation modified (e.g., by limiting its data rate and/or shifting its operating frequency).

Figure 11:
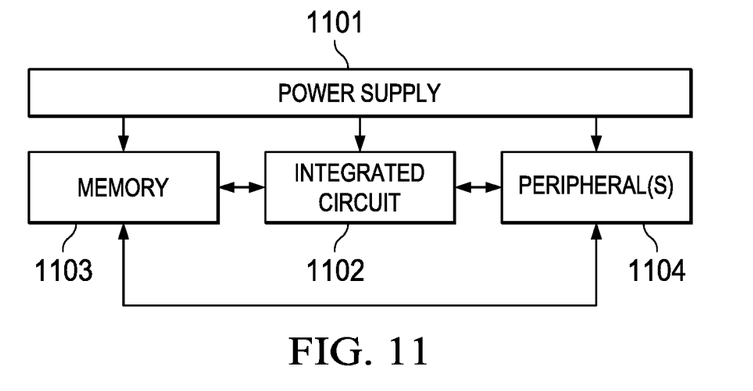
FIG. 11 is a block diagram of an integrated circuit according to some embodiments.

FIG. 11 is a block diagram of an integrated circuit according to some embodiments. In some cases, one or more of the devices and/or apparatuses shown in FIGS. 2-4 may be implemented as shown in FIG. 11. In some embodiments, integrated circuit 1102 may be a digital signal processor (DSP), an application specific integrated circuit (ASIC), a system-on-chip (SoC) circuit, a field-programmable gate array (FPGA), a microprocessor, a microcontroller, or the like. Integrated circuit 1102 is coupled to one or more peripherals 1104 and external memory 1103. In some cases, external memory 1103 may be used to store and/or maintain databases 304 and/or 404 shown in FIGS. 3 and 4. Further, integrated circuit 1102 may include a driver for communicating signals to external memory 1103 and another driver for communicating signals to peripherals 1104. Power supply 1101 is also provided which supplies the supply voltages to integrated circuit 1102 as well as one or more supply voltages to memory 1103 and/or peripherals 1104. In some embodiments, more than one instance of integrated circuit 1102 may be included (and more than one external memory 1103 may be included as well).

Peripherals 1104 may include any desired circuitry, depending on the type of PLC system. For example, in an embodiment, peripherals 1104 may implement local communication interface 303 and include devices for various types of wireless communication, such as Wi-Fi™, ZigBee®, Bluetooth®, cellular, global positioning system, etc. Peripherals 1104 may also include additional storage, including RAM storage, solid state storage, or disk storage. In some cases, peripherals 1104 may include user interface devices such as a display screen, including touch display screens or multi-touch display screens, keyboard or other input devices, microphones, speakers, etc.

External memory 1103 may include any type of memory. For example, external memory 1103 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, Rambus® DRAM, etc. External memory 1103 may include one or more memory modules to which the memory devices are mounted, such as single inline memory modules (SIMMs), dual inline memory modules (DIMMs) etc.

It will be understood that various operations illustrated in FIGS. 6-10 may be executed simultaneously and/or sequentially. It will be further understood that each operation may be performed in any order and may be performed once or repetitiously. In various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A power line communication (PLC) device comprising:
a physical (PHY) layer defining a device class of the PLC device, the device class having defined region specific attributes for the PHY or MAC layers of a PLC specification;
a processor; and
a memory coupled to the processor, the memory is configured to store program instructions, and the program instructions are executable by the processor to cause the PLC device to communicate with a higher-level PLC apparatus over a power line using a given frequency band, the given frequency band selected based, at least in part, upon an application profile and the device class of the PLC device, the program instructions are also executable by the processor to cause the PLC device to:
monitor one or more PLC communications between two or more other PLC devices over the power line;
identify a frequency band unused by the two or more other PLC devices; and
select the given frequency band as at least a portion of the unused frequency band.

2. The PLC device of claim 1, wherein the processor includes a digital signal processor (DSP), an application specific integrated circuit (ASIC), a system-on-chip (SoC) circuit, a field-programmable gate array (FPGA), a microprocessor, or a microcontroller.

3. The PLC device of claim 1, wherein the device class is defined with varying transmitter and receiver data rate capabilities at the PHY layer.

4. The PLC device of claim 1, wherein the device class is defined depending on MAC capabilities.

5. A power line communication (PLC) device comprising:
a physical (PHY) layer defining a device class of the PLC device, the device class having defined region specific attributes for the PHY or MAC layers of a PLC specification;
a processor; and
a memory coupled to the processor, the memory is configured to store program instructions, the program instructions are executable by the processor to cause the PLC device to communicate with a higher-level PLC apparatus over a power line using a given frequency band, the given frequency band selected based, at least in part, upon an application profile and the device class of the PLC device, and the program instructions are also executable by the processor to cause the PLC device to:
transmit a request to the higher-level PLC apparatus for an indication of availability of frequency bands, the higher-level PLC apparatus configured to maintain a record of frequency use by one or more other PLC devices configured to communicate over the power line;
receive instructions from the higher-level PLC apparatus indicating the availability or unavailability of one or more frequency bands; and
select the given frequency band based, at least in part, upon the received instructions.

6. A power line communication (PLC) device comprising:
a physical (PHY) layer defining a device class of the PLC device, the device class having defined region specific attributes for the PHY or MAC layers of a PLC specification;
a processor; and
a memory coupled to the processor, the memory is configured to store program instructions, the program instructions are executable by the processor to cause the PLC device to communicate with a higher-level PLC apparatus over a power line using a given frequency band, the given frequency band selected based, at least in part, upon an application profile and the device class of the PLC device, and the program instructions are also executable by the processor to cause the PLC device to:
transmit a request to the higher-level PLC apparatus to communicate over the power line, the request including an indication of the application profile and device class of the PLC apparatus, the higher-level PLC apparatus configured to allocate the given frequency band to the PLC device based, at least in part, upon an analysis of the request; and
receive instructions from the higher-level PLC apparatus allocating the given frequency band to the PLC device.

7. A method comprising:
performing, by a power line communication (PLC) apparatus, assigning a first frequency band to a first PLC device configured to communicate over a power line, the first frequency band selected based, at least in part, upon a first application profile and a first device class assigned to the first PLC device, the device class having defined region specific attributes for the PHY or MAC layers of a PLC specification;

receiving a request from the first PLC device to communicate over the power line;

determining a frequency band unused by one or more other PLC devices communicating over the power line; and transmitting an instruction to the first PLC device assigning the first frequency band as at least a portion of the unused frequency band.

8. The method of claim 7, wherein the PLC apparatus includes at least one of a PLC gateway or a data concentrator, and wherein the first PLC device includes a PLC modem.

9. The method of claim 7 further comprising:

performing, by the PLC apparatus, identifying a conflict between the first frequency band and a second frequency band in use by a second PLC device coupled to the power line, the second PLC device including a second application profile and a second device class; and resolving the conflict based, at least in part, upon a comparison between at least one of: (a) the first and second application profiles, or (b) the first and second device classes.

10. The method of claim 9, wherein resolving the conflict includes limiting a data rate of the second PLC device.

11. The method of claim 9, wherein resolving the conflict includes modifying the second frequency band of the second PLC device.

12. The method of claim 7, wherein the device class are assigned with varying transmitter and receiver data rate capabilities at the PHY layer.

13. The method of claim 7, wherein the device class are assigned depending on MAC capabilities.

* * * * *